May 6, 1958  R. E. BLADES  2,833,544
COMPENSATING TOOL HOLDER
Filed April 9, 1956  2 Sheets-Sheet 1

ROBERT E. BLADES
INVENTOR.

BY
ATTORNEY

May 6, 1958   R. E. BLADES   2,833,544
COMPENSATING TOOL HOLDER
Filed April 9, 1956   2 Sheets-Sheet 2

ROBERT E. BLADES
INVENTOR.

BY
ATTORNEY

United States Patent Office 2,833,544
Patented May 6, 1958

2,833,544

COMPENSATING TOOL HOLDER

Robert E. Blades, Hollywood, Calif., assignor, by mesne assignments, to Precision Processing Co., Glendale, Calif., a corporation of California Application April 9, 1956, Serial No. 577,108

6 Claims. (Cl. 279—6)

This invention relates to tool holders for use on machine tools and more particularly to a device which can be mounted between the machine tool proper and the usual chuck to correct for both angular and radial misalignments with respect to the working axis of the machine.

In the operation of machine tools, precision work requires highly accurate alignment. The work must be accurately positioned with respect to the cutting tool and if, because of wear or poor construction, the two are not properly related, the resultant work will be inexact and lacking in precision. All machines are subject to wear and the common practice is to discard worn parts and to replace them even though expensive. The present invention makes it possible to use machines in precision work which otherwise would be unsuitable through providing means to compensate for inaccuracies and misalignments present. The invention is characterized in that it can compensate for angular misalignments, offset or radial misalignments and combinations of both in the tool in which it is embodied. Earlier devices which have achieved limited acceptance are deficient in numerous respects including their inability to compensate accurately for radial misalignments throughout 360 degrees, and in their reliance on coupling principles which introduce troublesome tolerance problems.

In view of the desirable characteristics of a satisfactory compensating tool holder and the deficiencies of tool holder constructions heretofore proposed, it is a primary object of this invention to provide a new and improved noncocking tool holder adapted for installation on existing machine tools and capable of adjustment to compensate for angular or radial misalignments in the equipment including chucking devices, collets, spindles, tailstock structures, and the like.

Another object is the provision of a compensating tool holder with common means for adjustment to a desired position fully compensating for both wear and misalignments and for locking the parts in this adjusted position.

Still another object is the provision of a tool holder having a minimum number of parts consistent with its design objective of adjustment in any angular or radial direction required to bring a working tool into true alignment or true parallelism, as desired, with the axis of the work to be performed.

Other objects and advantages of the invention will be apparent from the following detailed specification of an illustrative embodiment of the invention considered with the accompanying drawings, wherein.

Figure 1:
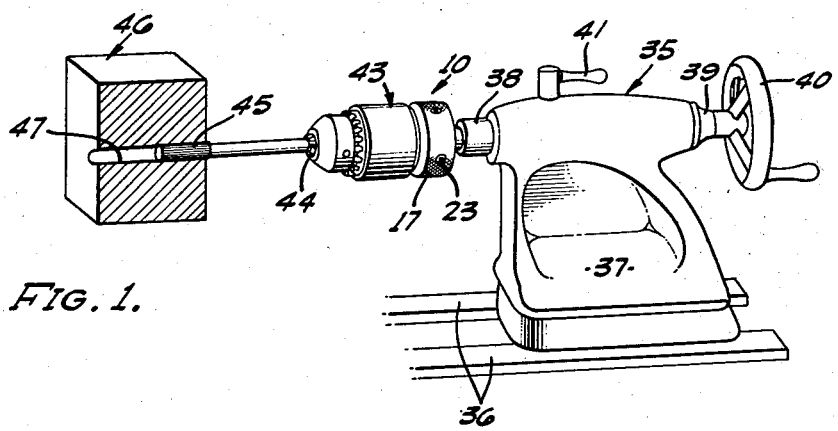
Figure 1 is a perspective view of the compensating tool holder of the present invention mounted in the tailstock of a lathe and supporting a chuck carrying a reaming tool.
Figure 2:
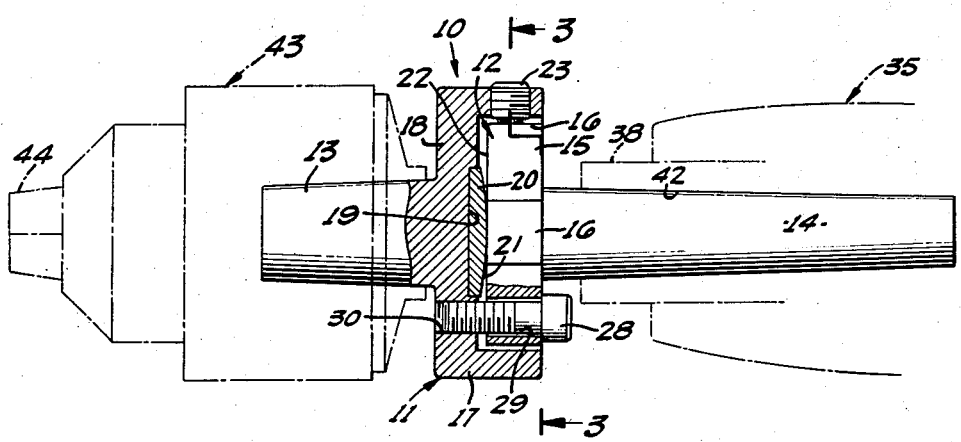
Figure 2 is a partial longitudinal section through the compensating tool holder with the tool chuck device and the seating portion of the tailstock of the lathe indicated in dot and dash outline.

Referring again to the drawings and particularly to Figures 1 and 2 it will be seen that the compensating tool holder comprising the invention, generally designated 10, comprises a pair of members 11 and 12 having tapered spindles or shanks 13 and 14, respectively, extending oppositely in general axial alignment with one another. The right-hand element 12, as viewed in Figure 2, has an integral disc-like head 15 provided with four flattened surfaces 16 on its rim centered 90 degrees apart circumferentially. Head 15 is formed to nest loosely within the annular encircling side wall of cup-like head 17 of member 11. The bottom wall 18 of head 17 is integral with the large diameter end of spindle 13 and is provided with a circular recess or well 19 adapted to seat snugly a disc-like member 20 having a case hardened spherical surface 21 providing a bearing surface for the end surface 22 of head 15 of member 12.

Figure 3:
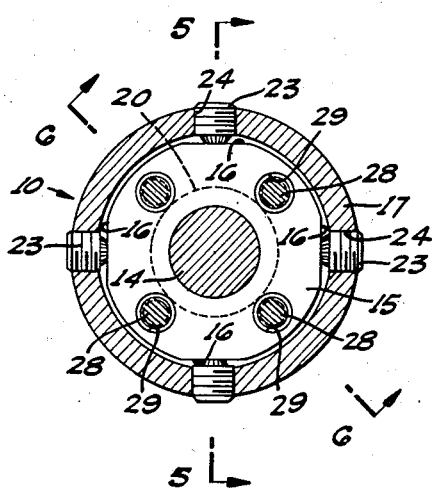
Figure 3 is a transverse section taken along the broken line 3—3 of Figure 2.
Figure 4:
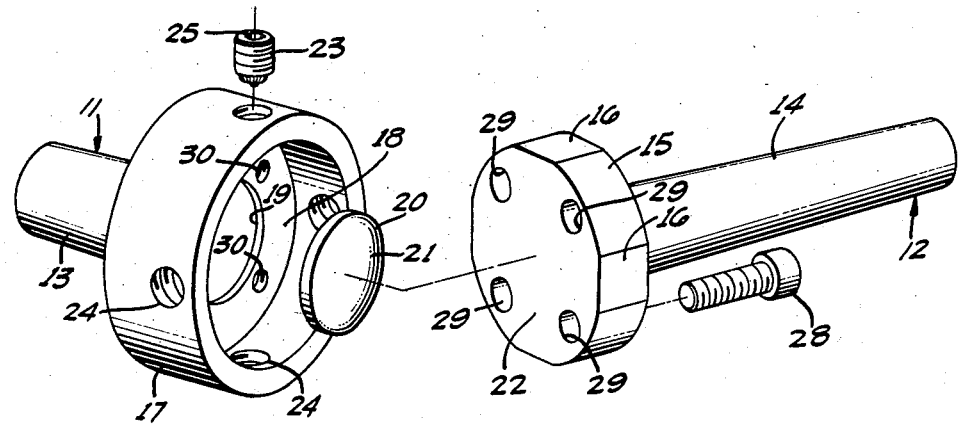
Figure 4 is an exploded view in perspective showing parts of the invention disassembled from one another.

Members 11 and 12 of the tool holder are secured together adjustably by radially extending and longitudinally extending sets of threaded members. The radial set comprises four set screws 23 seated in threaded radially extending openings 24 in the side wall of cup 17 and circumferentially spaced 90 degrees apart. The outer ends of the set screws are provided with non-circular seats 25 to receive the end of a suitable wrench used in adjusting the position of the screws. As best shown in Figure 3, the inner ends of the set screws are positioned to bear against flat surfaces 16 on the peripheral rim of spindle head 15 and it will be understood that by the cooperative adjustment of the four set screws 23 the head 15 of spindle member 12 can be shifted radially in any desired direction throughout 360 degrees relative to the axis of member 11 and its head 17.

The longitudinally extending set of adjustment screws comprises four cap screws 28 seated in threaded seats 30 formed in the bottom wall 18 of head 17. These screws extend parallel to the axis of spindle member 11 through bores 29 spaced 90 degrees apart in head 15 midway between the flats 16. The shanks of cap screws 28 are of considerably smaller diameter than bores 29 in spindle head 15 to permit both radial shifting and angular tilting of the two spindles relative to one another.

The tool holder may be used in various locations on a machine tool in which it can perform its function of bringing an element to be supported into proper axial and angular alignment. In the drawing it is shown for illustrative purposes as carried by the tailstock 35 of a conventional lathe. Tailstock 35 comprises a pedestal 37 having a base slidably mounted for movement along lathe guideways 36 and adjustably supports an arbor 38.

Arbor 38 is formed with an outwardly opening tapered seat 42 adapted to seat frictionally the tapered shank of a tool holder and is, in a manner conventional in lathes and forming no part of the present invention, suitably engaged by the inner end of a rotatable shaft 39 in a manner such that the rotation of the shaft serves to move it inwardly or outwardly. A handwheel 40 is carried by the end of shaft 39 and provides means by which the shaft can be rotated for the purpose of adjusting the arbor to a desired position in which it can be locked by pivoting a second handle or lever 41 connected to suitable unshown arbor-clamping means.

A chuck 43 of conventional design is adapted to seat on tapered spindle 13 and is anchored against relative rotation. In accordance with usual practice chuck 43 is provided with a plurality of radially shiftable jaws 44 to receive and clamp a cutting tool, as for example a reaming tool 45 as shown in Figure 1. The workpiece generally designated at 46 and having a bore 47 to be reamed represents any workpiece and is suitably mounted in the machine for rotation about the axis of bore 47.

*Operation*

Let it be assumed that the lathe represented generally by the tailstock 35 and guideways 36 of Figure 1 is a typical high precision lathe in which the axis of arbor 38 is in slight misalignment with the axis of rotation of the mounting in which the workpiece 46 is carried. Also, let it be assumed that the chuck 43 has been in use for some period of time and that its clamping jaws are no longer capable of accurately centering a work tool, such as reamer 45, when the jaws are clamped against its shank with the result that the reamer is supported in general alignment with the chuck but radially off center from the chuck axis. The first step in adjusting the tool holder to compensate for this double misalignment caused by the misalignment of arbor 38 and the worm chuck jaws is to make certain that the tapering shank 14 of the compensating tool holder 10 is firmly seated in its seat in arbor 38 and that chuck 43 is firmly seated on the oppositely extending tapering shank 11 of the holder. The two sets of adjusting screws 23 and 28 are then loosened after first making certain that clamp 41 for arbor 38 is firmly tightened so that the arbor cannot move. The several adjusting screws are then selectively adjusted in small increments until the axis of the tool 45 is in true and accurate alignment with the axis of bore 47 in workpiece 46 which has been previously accurately centered within the power-driven mounting chuck of the lathe.

Figure 5:
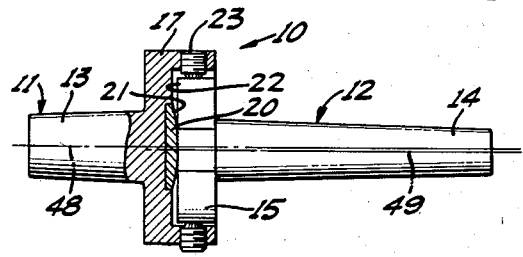
Figure 5 is a side elevational view, partly in section, showing the tool holder adjusted to compensate for radial misalignment.
Figure 6:
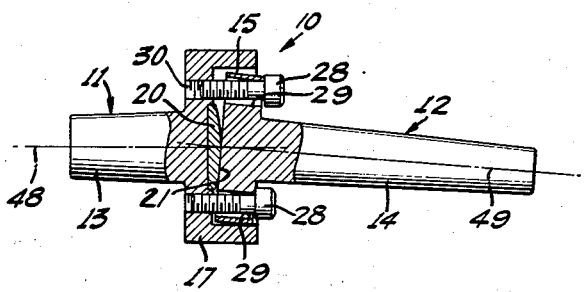
Figure 6 is a view similar to Figure 5 but showing the tool holder adjusted to compensate for angular misalignment.

Lateral displacement of the axis of the chuck 43 is accomplished by the adjustment of the screws 23 while change in angularity is the result of adjustment of screws 28. In the assumed case in which the misalignment of the reamer involved both radial displacement and angular misalignment, it was necessary to shift the chuck mounting member 11 of the tool holder laterally with respect to the member 12 for the purpose of making coaxial the axis of the reamer and the axis of the bore 47. Concurrently it was necessary to adjust angularly the member 11 by rocking its end surface 22 upon the opposed convex surface 21 of the bearing plate 20. The adjustments required to compensate for the assumed conditions are illustrated in somewhat exaggerated degree in Figures 5 and 6. Thus in Figure 5, the axes 48, 49 of spindles 13 and 14, respectively, have been radially offset and are held by set screws 23. In Figure 6 cap screws 28 have been adjusted to secure the axes of the spindles in the angular relationship required.

While the particular compensating tool holder herein shown and described in detail is fully capable of attaining the objects and providing the advantages hereinbefore stated, it is to be understood that it is merely illustrative of the presently preferred embodiment of the invention and that no limitations are intended to the details of construction or design herein shown other than as defined in the appended claims.

I claim:

1. An article of manufacture comprising a tool holder for use in a machine tool to compensate for both radial and angular misalignment between a tool chuck and the operating axis of the machine tool, said article comprising a pair of oppositely directed tapering spindles, one of said spindles having a disc-like head integral with and projecting radially from its larger end, the other spindle having its large diameter end integral with the bottom wall of a cup-shaped member adapted to telescope over and fit loosely about said disc-like head, means including a plurality of adjusting screws extending axially and radially between the opposed end walls and circumferential walls of said head and cup-shaped member for adjusting said spindles with the respective axes thereof in radially offset and angularly inclined positions as necessary to compensate for a particular misalignment condition and for locking the same in said adjusted position.

2. An adjustable compensating tool holder for use in supporting a cutting tool in alignment with the operating axis of a machine tool comprising, a pair of tapering spindles having integral means at their respective adjacent larger diameter ends for holding said spindles rigidly anchored together in a desired compensating position with their axes adjusted angularly and offset radially with respect to one another to the extent required to bring the axis of a tool supported by one of said spindles into true alignment with the operating axis of a machine tool, said integral means including a disc-like head integral with the end of one spindle and nested in spaced relation to the inner side and bottom walls of a cup-shaped member integral with the adjacent end of the other spindle, and a plurality of radially and axially extending adjustable screws interposed between said head and cup-shaped member for shifting said pair of spindles relatively to one another and for locking the same in a desired angular and radially offset position.

3. An adjustable compensating tool holder as defined in claim 2 including means providing a bearing surface conforming to the shape of a sphere between the bottom of said cup-shaped member and the juxtaposed end surface of said disc-like head, said adjustable screws being operable to hold said bearing surface and the end surface of said head in pressure contact when said spindles are locked in a desired adjusted position.

4. An adjustable compensating tool holder for use in rigidly supporting a cutting tool in true alignment with the operating axis of a machine tool comprising a pair of oppositely directed oppositely tapering spindles having adjustable coupling means holding the adjacent ends of the spindles nested together immovably in any desired angular and radially offset position required to compensate for misaligned conditions while said holder is in use on a machine tool, said coupling including a disc-like head integral with the large end of one of said spindles and normal to the axis thereof, the large diameter end of the other spindle having an axial bore in its end of substantially greater diameter than the diameter of said head, a plurality of adjustable screws extending radially through the side wall of said bore into engagement with spaced flattened areas distributed about the rim of said head for shifting said spindles radially with respect to one another in any desired direction, a plurality of adjustable screws extending parallel to the axes of one of said spindles and interconnecting the nested ends thereof at a plurality of points concentric with the spindle axes, and means providing a spherical bearing surface between the abutting ends of said spindles, said adjusting screws providing means for adjusting said spindles with their axes radially offset and extending in any desired angular relationship and for rigidly clamping said spindles immovably in this adjusted position.

5. An adjustable compensating tool holder comprising a first tapering spindle member with a disc-like head integral with the large diameter end thereof and lying in a plane normal to the axis of the spindle, a second tapering spindle member having a cup-shaped end of substantially greater interior diameter than the diameter of said head and adapted to enclose said head, means between the end face of said head and the interior bottom face of the cup-shaped end of said second spindle member providing a spherical bearing surface between the abutting ends of said spindle members, and a set of radially adjustable screw means and a set of axially adjustable screw means extending between said head and said cup-shaped end cooperable with one another for holding said spindle members locked immovably together with their axes in any desired radially offset and angular relationship.

6. An adjustable compensating tool holder as defined in claim 5 wherein said spherical surfaced means comprises a wafer-like member having a spherical surface on one of its faces and held seated against radial displacement in a well in the end face of one of said spindle members.

References Cited in the file of this patent

UNITED STATES PATENTS

| | | |
|---|---|---|
| 2,288,907 | Klute | July 7, 1942 |
| 2,353,834 | Klute | July 18, 1944 |
| 2,392,039 | Gideon | Jan. 1, 1946 |
| 2,435,396 | Koch | Feb. 3, 1948 |
| 2,733,073 | Phillips | Jan. 31, 1956 |